United States Patent Office 2,976,287
Patented Mar. 21, 1961

2,976,287

NAPHTHOFURANEDIONE VAT DYESTUFFS

David I. Randall, New Vernon, and Wilhelm Schmidt-Nickels, Little York, N.J., assignors to General Aniline & Film Corporation, New York, N.Y., a corporation of Delaware No Drawing. Filed Dec. 3, 1958, Ser. No. 777,827

8 Claims. (Cl. 260—249.6)

This invention relates to novel heterocyclic vat dyestuffs having the formula

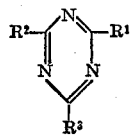

wherein $R^1$ has the formula

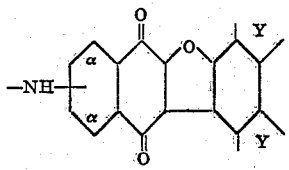

in which one adjacent pair of Y valences are bonded to hydrogen atoms, the other adjacent pair of Y valences are bonded to a radical of the formula

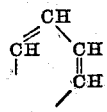

and the —NH— group is bonded in one of the $\alpha$ positions shown, and $R^2$ and $R^3$ are selected from the group consisting of $R^1$, phenoxy and naphthoxy.

The provision of the above described compounds, and methods for their production constitutes the objects and purposes of the instant invention.

The compounds of the instant invention may be prepared by reacting one mole of cyanuric chloride with $n$ moles of a dyestuff intermediate of the formula shown for $R^1$ above joined to a hydrogen atom, and 3-$n$ moles of phenol, naphthol or a lower alkyl or alkoxy substituted derivative thereof, $n$ being an integer of 1 to 3.

The above dyestuff intermediates having the formula

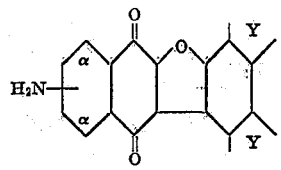

and methods for their manufacture are disclosed in our copending application Serial No. 774,169, filed on November 17, 1958. These dyestuff intermediates, as disclosed in said application, are prepared by reacting 1 mole of 8-nitro-2,3-dichloro-1-4-naphthoquinone with 1 mole of 1-naphthol or 2-naphthol in the presence of an alkaline acid binding agent, followed by the step of reducing the nitro groups in the resulting product to amino groups, as by treatment with sodium hydrosulfite. The initial reaction always produces a dual component mixture of isomers in one of which the nitro group is bonded in one $\alpha$ position and in the other of which the nitro group is bonded in the other $\alpha$ position. This isomeric mixture may be subjected to reduction to produce a mixture of the corresponding amino-substituted isomers, or the isomers in said isomeric mixture may first be separated from each other in known manner, as by fractional precipitation, fractional crystallization, vacuum sublimation or chromatographic adsorption, as disclosed in said application after which each of the separated isomers may be reduced to the corresponding amino-substituted intermediate. It will be understood that the dyestuff intermediate employed in the process of the present invention may be a single isomer in which the amino group is bonded in either of the $\alpha$ positions shown, or, preferably, a mixture of such isomers.

Where only one or two moles of said dyestuff intermediate ($n$ is one or two) are reacted with 1 mole of the cyanuric chloride in accordance with the present invention, the remaining reactive chlorine atoms in the cyanuric chloride are reacted with, respectively, 2 or 1 mole of phenol, naphthol, or a lower alkyl or lower alkoxy substituted derivative thereof. Such derivatives may contain from 1 to 3 nuclearly substituted lower alkyl groups such as methyl or ethyl or lower alkoxy groups such as methoxy or ethoxy. Either 1-naphthol or 2-naphthol may be employed as the naphthol reactant in the present process. Examples of such substituted reactant include 1-methyl-2-naphthol, 2-methyl-1-naphthol, 2,3-, 6-, and 3,5-dimethoxy phenols, xylenol, o-, m-, and p-methyl, methoxy, ethyl and ethoxy phenols, 2-methoxy-4-methyl phenol and 2,4,5- and 2,4,6-trimethyl phenols.

When three moles of said dyestuff intermediate (single isomer or mixture of isomers) are reacted with one mole of cyanuric chloride the reaction is preferably carried out in the presence of an inert organic diluent such as an aromatic hydrocarbon or halogenated hydrocarbon or a phenol or naphthol. As representative of such diluents, there may be mentioned nitrobenzene, chlorobenzene, dichlorobenzene, trichlorobenzene, naphthalene, meta or para cresol, phenol, 1- or 2-naphthol or the like. The phenols and naphthols are in this instance inert to the reaction which is preferential between the cyanuric chloride and the said dyestuff intermediate.

When only one or two moles of the said dyestuff intermediate are reacted with each mole or cyanuric chloride, the remaining reactive chlorine atoms in the cyanuric chloride molecule are reacted with, respectively, 2 or 1 mole of the said phenol or naphthol reactant. In this embodiment of the process, the latter reactant may serve simultaneously as the sole diluent.

The reaction is preferably carried out in a non-aqueous medium and, if desired, in the presence of an alkaline acid binding agent such as sodium carbonate, potassium carbonate or the like. Elevated reaction temperatures are employed, generally ranging from about 100° C. up to the boiling point of the reaction medium. The optimum temperature in any particular instance will be readily ascertainable by the worker skilled in the art.

The novel vat dyestuffs of this invention generally yield red to orange shades on cotton and other fibers having good to excellent fastness properties to washing, chlorine and/or light.

The following examples, in which parts are by weight, unless otherwise indicated, are illustrative of the instant invention and are not to be regarded as limitative.

Example 1

A charge of 350 cc. of a mixture of m- and p-cresols, 5.10 g. of the binary mixture of isomeric compounds of the structure:

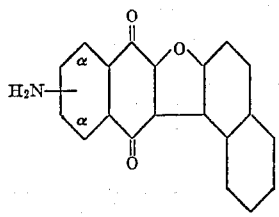

in one of which the $H_2N$-group is bonded in one α position and in the other of which the $H_2N$-group is bonded in the other α position (prepared as described in Example 2 of said copending application by reaction of 1 mole of 8-nitro-2,3-dichloronaphthoquinone with 1 mole of 2-naphthol followed by reduction of the nitro groups in the resulting binary isomeric mixture) and 0.80 g. of cyanuric chloride is heated to 118° C. over 5½ hours, held at about this temperature for 1½ hours and then refluxed for 2 hours. The reaction product is filtered off at room temperature, washed with acetone and dried.

The product is obtained in the form of hard dark lumps. It vats readily to a brilliant orange vat, dyeing cotton in a strong, fairly bright scarlet shade. It is a mixture of the four possible isomeric compounds of the formula:

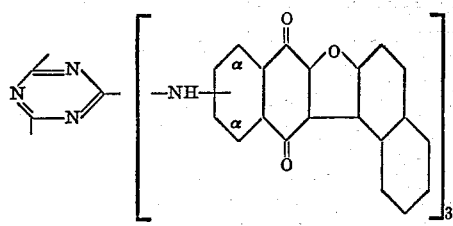

Example 2

The process of Example 1 is repeated except that the compounds in the binary mixture of isomers employed therein have the structure

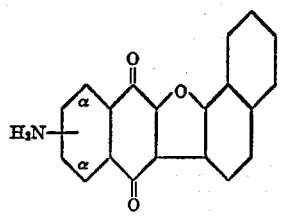

in one of which the $H_2N$-group is bonded in one α position, and in the other of which the $H_2N$-group is bonded in the other α position (prepared as decribed in Example 1 of said copending application, by reaction of 1 mole of 8-nitro-2,3-dichloronaphthoquinone with 1 mole of 1-naphthol followed by reduction of the nitro groups in the resulting binary isomeric mixture).

Similar results are obtained, the compounds in the resulting mixture having the formula

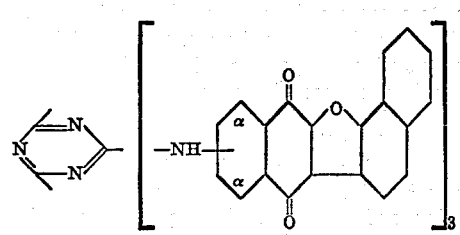

Example 3

A charge of 200 g. of phenol and 5.0 g. of the binary mixture of isomeric compounds employed in Example 1 is heated to about 110° C. after which 1.8 g. of cyanuric chloride is added. The mixture is maintained at 105 to 110° C. for about 2 hours and then refluxed for about 3 hours. The resulting mixture is diluted with acetone at 120° C. to precipitate the dyestuff product which is then filtered off at room temperature, washed with acetone to a colorless wash, and dried.

The product vats readily, dyeing cotton in a strong, bright, reddish orange shade of good light fastness and chlorine fastness. It is a mixture of the three possible isomeric compounds of the formula

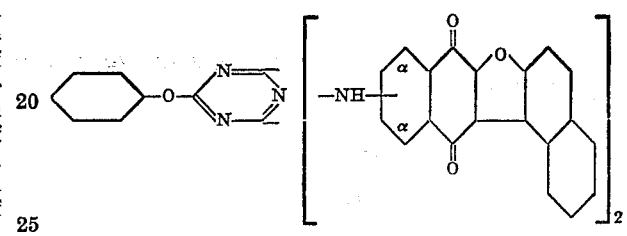

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

This application is a continuation-in-part of our copending application Serial No. 556,414, filed on December 30, 1955, now U.S. Patent 2,870,168.

We claim:

1. A process comprising reacting by heating at a temperature ranging from about 100° C. up to the boiling point of the reaction medium 1 mole of cyanuric chloride with 3 moles of a dyestuff intermediate of the formula

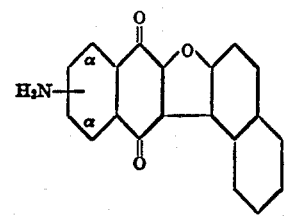

in which the $H_2N$-group is bonded in one of the α positions shown.

2. A process comprising reacting by heating at a temparature ranging from about 100° C. up to the boiling point of the reaction medium 1 mole of cyanuric chloride with 3 moles of a dyestuff intermediate of the formula

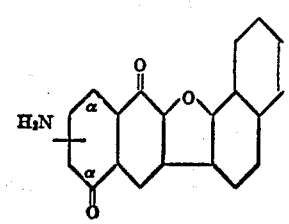

in which the $H_2N$-group is bonded in one of the α positions shown.

3. A process comprising reacting by heating at a temperature ranging from about 100° C. up to the boiling point of the reaction medium 1 mole of cyanuric chloride with 2 moles of a dyestuff intermediate of the formula

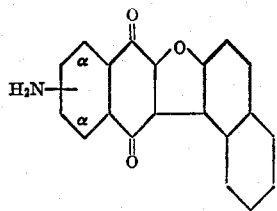

in which the H₂N-group is bonded in one of the α positions shown, and 1 mole of phenol.

4. Compounds of the formula

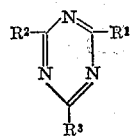

wherein R¹ is selected from the group consisting of

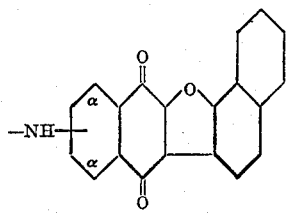

and

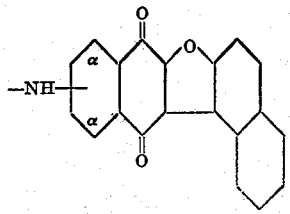

and the —NH— group is bonded in one of the α positions shown, and $R^2$ and $R^3$ are selected from the group consisting of $R^1$, phenoxy and naphthoxy.

5. Compounds of the formula

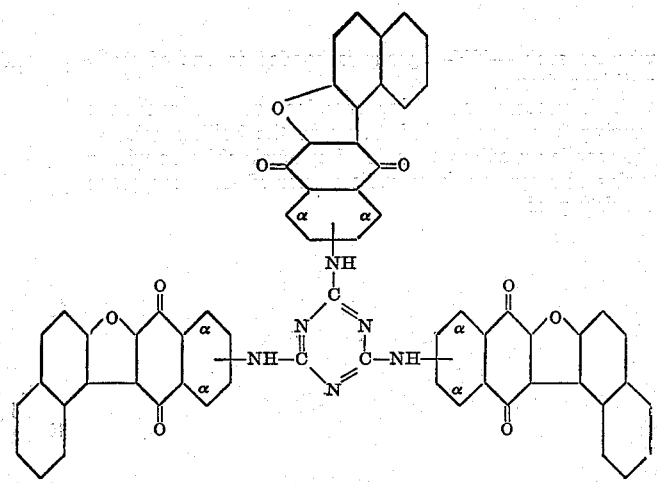

wherein each —NH— group is bonded in one of the α positions shown.

6. Compounds of the formula

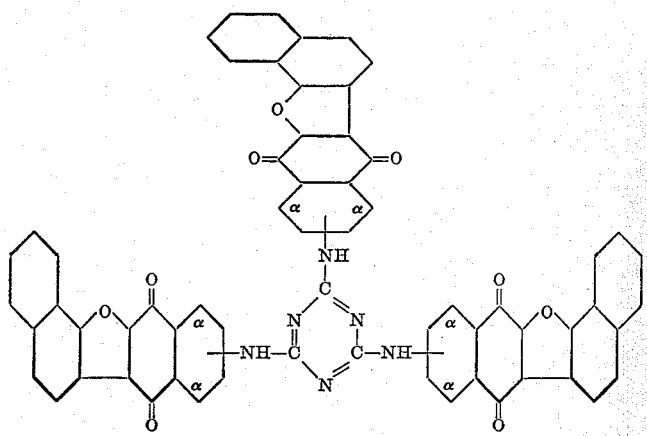

wherein each —NH— group is bonded in one of the α positions shown.

7. Compounds of the formula

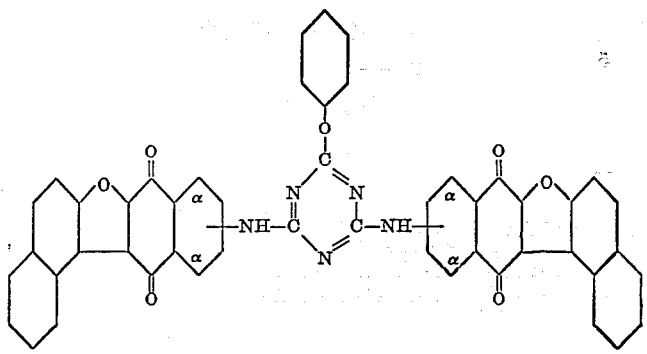

wherein each —NH— group is bonded in one of the α positions shown.

8. A process comprising reacting, at a temperature ranging from about 100° C. up to the boiling point of the reaction medium, 1 mole of cyanuric chloride with $n$ moles of a dyestuff intermediate selected from the group consisting of

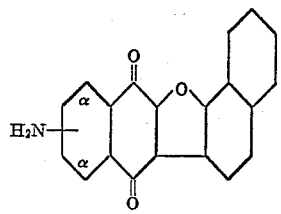

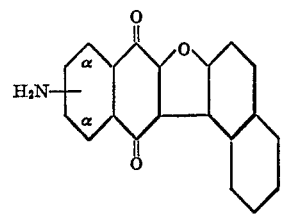

wherein the —NH$_2$ group is bonded in one of the α positions shown, and 3-$n$ moles of a member selected from the group consisting of phenol, naphthol and lower alkyl and lower alkoxy substituted derivatives thereof, $n$ being an integer of from 1 to 3.

References Cited in the file of this patent
UNITED STATES PATENTS

| | | |
|---|---|---|
| 2,862,931 | Schmidt-Nickels et al. | Dec. 2, 1958 |
| 2,862,932 | Schmidt-Nickels | Dec. 2, 1958 |
| 2,870,168 | Randall et al. | Jan. 20, 1959 |